United States Patent
Wiewiura (10) Patent No.: US 7,005,997 B1
(45) Date of Patent: Feb. 28, 2006

(54) REMOTE EMERGENCY POWER SHUTOFF AND ALARM SYSTEM

(76) Inventor: Jeffrey Wiewiura, c/o Safety Zone 7016 Centralia St., Dearborn Heights, MI (US) 48127

( * ) Notice: Subject to any disclaimer, the term of this patent is extended or adjusted under 35 U.S.C. 154(b) by 1 day.

(21) Appl. No.: 10/464,944

(22) Filed: Jun. 19, 2003

Related U.S. Application Data (60) Provisional application No. 60/389,785, filed on Jun. 19, 2002.

(51) Int. Cl.
  *G08B 21/00* (2006.01)
(52) U.S. Cl. ............ 340/679; 340/426.12; 340/426.17; 340/825.23; 340/3.1; 700/12; 700/17
(58) Field of Classification Search .......... 340/426.12, 340/426.17, 825.23, 3.1, 853.3
  See application file for complete search history.

(56) References Cited

U.S. PATENT DOCUMENTS

| | | | |
|---|---|---|---|
| 4,378,507 A * | 3/1983 | Root ........................ | 307/326 |
| 4,628,306 A | 12/1986 | Root | |
| 5,396,222 A * | 3/1995 | Kus et al. .................. | 340/679 |
| 5,805,057 A | 9/1998 | Eslaminovin | |
| 5,917,405 A * | 6/1999 | Joao ...................... | 340/426.17 |
| 6,072,248 A | 6/2000 | Muise et al. | |
| 6,285,860 B1 * | 9/2001 | Szarka et al. .............. | 455/66.1 |
| 6,408,952 B1 * | 6/2002 | Brand et al. ................. | 175/24 |
| 2002/0081975 A1 * | 6/2002 | Szarka et al. ................. | 455/66 |
| 2003/0058087 A1 * | 3/2003 | Wenzel et al. .............. | 340/438 |

OTHER PUBLICATIONS

Inovonics Wireless Corporation, Product Data Sheet FA223S & FA223D.

\* cited by examiner

*Primary Examiner*—Benjamin C. Lee
(74) *Attorney, Agent, or Firm*—Carrier, Blackman & Associates, P.C.; William D. Blackman; Joseph P. Carrier (57) ABSTRACT

A remotely controllable shutoff system is operable to temporarily disable a machine, for the safety of persons and property close to the machine. The system includes a remote transmitter assembly, equipped with a shutoff actuator, and a receiver unit also including a manual reset mechanism. When a shutoff signal is generated by the transmitter, the receiver unit is capable of immobilizing the machine or a designated section thereof. Operation of the machine may be resumed only after resetting at least one manual reset mechanism on the remote transmitter and/or the receiving unit.

16 Claims, 8 Drawing Sheets

REMOTE EMERGENCY POWER SHUTOFF AND ALARM SYSTEM

PRIORITY

The current invention claims priority from Provisional Application 60/389,785 filed Jun. 19, 2002.

FIELD OF THE INVENTION

The present invention relates to a remotely controllable shutoff device for stationary or movable machinery. More particularly, the present invention relates to a remote controlled shutoff device for machinery which requires manual resetting after a safety shutoff has been activated.

BACKGROUND OF THE INVENTION

There are many known devices for remotely disengaging the operation of a vehicle, which devices are widely used in numerous commercial and industrial settings, and which vary greatly in terms of their function and ability. Typically, remote shutoff devices, of the kind generally relevant as background to the present invention, are used in connection with vehicles which require the assistance of a guide or "spotter" during operation in environments where other workers are moving about, as well as in an industrial setting such as a production or assembly line.

Within environments where vehicles or machines operate in close proximity to individuals and/or property, there is some risk of injury to those individuals or property. As a result, conventional safety measures within these environments include the use of two-way radios, for communication between the operator of a vehicle and a person located near the moving vehicle, commonly referred to as a "spotter". It is the spotter's job to warn the vehicle operator of any impending likelihood of injury or collision.

While the two-way radio serves to significantly reduce the likelihood of injury to surrounding persons and/or property, there are occasions where, despite use of the two-way radio, there is a risk of injury occurring as a result of the machine operator being unable to hear the radio communication. The machine operator may be unable to hear the radio due to ambient noise, or injury may occur due to the inherent delay between a remote spotter noticing a problem developing, the remote spotter sending a stop request to the vehicle operator, the vehicle operator receiving the stop request, and the actual stopping of the machine.

In other situations, a machine operator, repairman or observer may be required to move about in the immediate area of a conveyor or stationary machine having moving parts. The operator may need a remotely controllable shutoff and/or warning device, to quickly warn others or interrupt operation of the machine, in case a hazardous situation arises.

In an attempt to reduce the occurrence of injury to persons and property, remote shutoff devices were developed to immobilize a moving movable machine. Several variants of remote shutoff devices are illustrated in U.S. Pat. Nos. 4,628,306, 5,805,057, 6,072,248, and 6,285,860.

Root, U.S. Pat. No. 4,628,306, entitled, "Remote Control System For Automated Equipment," discloses a radio-frequency control system for a robotic device. The system of Root provides both a "soft stop" or "cycle hold" control and a "hard stop" function. The system of Root is provided for a technician who may be repairing the robotic device with the normal proximity switches deactivated for the repair operation.

Eslaminovin, U.S. Pat. No. 5,805,057, entitled, "Remote Vehicle Disabling And Distress Indicator System," discloses a remote control system for use with motor vehicles. The system of Eslaminovin is operated using a remote telephone, which sends a signal to a modular telephone stored in the vehicle. A distress signal sent to the modular telephone will deactivate the vehicle, either by deactivating the ignition coil or by closing a fuel shutoff valve.

Muise et al., U.S. Pat. No. 6,072,248, entitled, "Method of and System for Externally and Remotely Disabling Stolen or Unauthorized Operated Vehicles by Pursuing Police and the Like," discloses a system in which an anti-theft receiver is provided in a vehicle, and this receiver may receive signals from a pursuing police car, at such time as the vehicle is being operated by an unauthorized driver. The receiver of Muise et al. is capable of controlling fuel flow to the engine to provide a successive reduction in fuel supply, finally shutting off all fuel flow thereto and stopping the car.

Szarka et al., U.S. Pat. No. 6,285,860, entitled, "Construction Equipment Lockout System With Emergency Shutdown," discloses a system which can be used with a movable robotic machine such as a directional drill. In particular, the control system of Szarka et al. provides a lockout function which inhibits one or more functions of the equipment being operated, under predetermined operating conditions. The functions may include power to the hydraulic unit, engine power, power wrench operation, etc. The equipment lockout control system of Szarka et al. includes at least one radio receiver that includes an equipment inhibitor device for disabling a function of the equipment. A portable transmitter that is operable by an operator is located on or near the operator. The portable transmitter includes circuitry for generating a continuous radio signal that is receivable by the receiver. Upon detecting an interruption in the continuous radio signal, the receiver renders the equipment inhibitor effective, and disables a function of the equipment.

While the aforementioned inventions provide a variety of remote shutoff devices to temporarily render machinery inoperable, a need still exists in the art for a remote shutoff device which enables a machine operator, observer or "spotter" to temporarily disable the vehicle or other machine, in the event such action is necessary to protect persons or property, and which requires a manual reset of the machine, prior to rendering the machine operable once again.

SUMMARY OF THE INVENTION

The present invention has been developed to overcome limitations and disadvantages of known remote shutoff devices, and to generally fulfill a need in the art for an improved remote shutoff device for use in stationary or movable machines, which device is operable to safely and effectively interrupt operation of machinery.

A remotely controllable shutoff system, according to a first embodiment of the invention, when operatively connected to a machine, is operable to temporarily disable the machine, for the safety of persons and property close to the machine. The system according to the first embodiment includes a portable transmitter, which may be equipped with a manual reset mechanism and/or a shutoff/alarm actuator.

The system also includes a receiver unit incorporating a manual reset mechanism. When activated, the receiver unit is capable of immobilizing the machine, or a designated section thereof. Alternatively, the receiver may be set to activate an audible or visual alarm to alert others of a hazardous situation.

In a situation where operation of the machine is temporarily interrupted, operation of the machine cannot resumed until at least one reset mechanism on the remote transmitter and/or the receiving unit has been manually reset.

The remote shutoff system, in accordance with the first embodiment hereof may be used with the receiver thereof installed within a movable vehicle such as a piece of construction equipment, and at least one portable transmitter is provided for use by a person outside the vehicle. Optionally, a plurality of transmitters may be used, each of the transmitters capable of sending a shutoff signal to the machine via the receiver. As noted, each of the transmitters and the receiver, respectively, may be equipped with a manual reset mechanism.

Accordingly, in a modified version of the first embodiment thereof, an apparatus according to the invention includes a receiver unit including a radio frequency (RF) antenna capable of receiving a signal from a remote transmitter assembly, a relay including a relay operator and relay contacts, the relay being energizable in response to the receipt of the RF signal, and a manual reset switch operable to de-energize the relay.

The receiver unit is provided for installation on machinery, in a location where it will be able, upon receipt of a signal, to interrupt power to the machine.

In a variation of the first embodiment, the receiver unit may be installed on machinery in such a manner so as to only interrupt power to a selected portion of the machine. By way of example, a construction vehicle, such as a front-end loader, may be equipped with an embodiment of the invention which is operable to temporarily disable only its hydraulic movement, fuel supply or other selected portion thereof.

The apparatus according to the first embodiment, also includes at least one portable remote transmitter assembly, including an RF antenna capable of sending a signal to the receiver unit installed within machinery, an RF transmitter capable of generating and discharging a signal upon activation, an activator for energizing the RF transmitter. Optionally, the remote transmitter may include a manual reset switch, to disengage the transmission of a signal from the remote transmitter assembly.

One or more spotters outside of the movable machine hold(s) the remote transmitter assembly during operation of the machine. In the event that a spotter notices a risk of imminent potential injury to persons or property, the spotter activates the transmitter, sending a shutdown signal to the receiver unit, and ultimately interrupting operation of the movable machine.

In the operation of the system according to the present invention, after sending a shutoff signal, the movable machine may remain temporarily disabled until such time as all manual resets of the receiver unit and the portable remote transmitter assembly or assemblies are switched to the system run position. The requirement that all manual resets are returned to a run position provides an additional safety device, which requires both the machine operator and the spotter to remain attentive to a potentially injurious situation.

Alternatively, the receiver may be connected to only a single manual reset switch, which may be located outside of the cab of a movable machine, thus requiring the machine operator to leave the cab, or the switch to be reset by a person outside of the cab.

In a second embodiment of the invention, multiple remote transmitter assemblies are provided, to simultaneously operate with a single receiver unit. Where multiple transmitters are used, each transmitter has a number assigned to it, and each transmitter operates on its own selected frequency. Use of multiple remote transmitter assemblies accommodates the need in the field for the use of more than one guide, spotter, observer or operator. Additionally, the portable remote transmitter assembly may incorporate a signal programming/reprogramming means, which may allow operation on a selected frequency, to permit the use of multiple remote transmitter assemblies with one designated receiver unit, as well as the use of any remote transmitter with any receiver unit.

In a third embodiment of the present invention, the portable remote transmitter assembly may be incorporated within a two-way radio unit. Two-way radios are typically used in industrial and commercial settings where guides or spotters are used during operation of machinery, and incorporation of the remote transmitter assembly of the present invention into a two-way radio combines two safety features within one housing.

In a fourth embodiment of the present invention, the portable transmitter assembly includes at least one visual display to indicate the status of the system (i.e. whether activated or deactivated). A visual display, such as a light, LED readout, or liquid crystal display, readily provides status information to a spotter, thereby preventing false or accidental deployment of the shutdown system. Similarly, the receiver unit incorporates at least one visual display to indicate system status.

In a fifth embodiment of the invention, a large, stationary machine with moving parts, such as a conveyor, industrial baler or shredder may require one or more operators, observers or spotters to be moving about the machine, and each of the operators may have an independent transmitter in communication with a receiver on the machine. In the fifth embodiment, each transmitter is independently capable of generating a warning alarm and/or temporarily interrupting operation of the machine.

Other objects, advantages and salient features of the invention will become apparent from the following detailed description which, in conjunction with the annexed drawings, describes the presently contemplated embodiments of the invention.

DETAILED DESCRIPTION

Overview

The present invention provides a remotely controllable shutoff and alarm system for a stationary or movable machine. A remotely controllable shutoff/alarm system, according to the invention, includes a transmitter assembly and a receiver unit.

Figure 1:
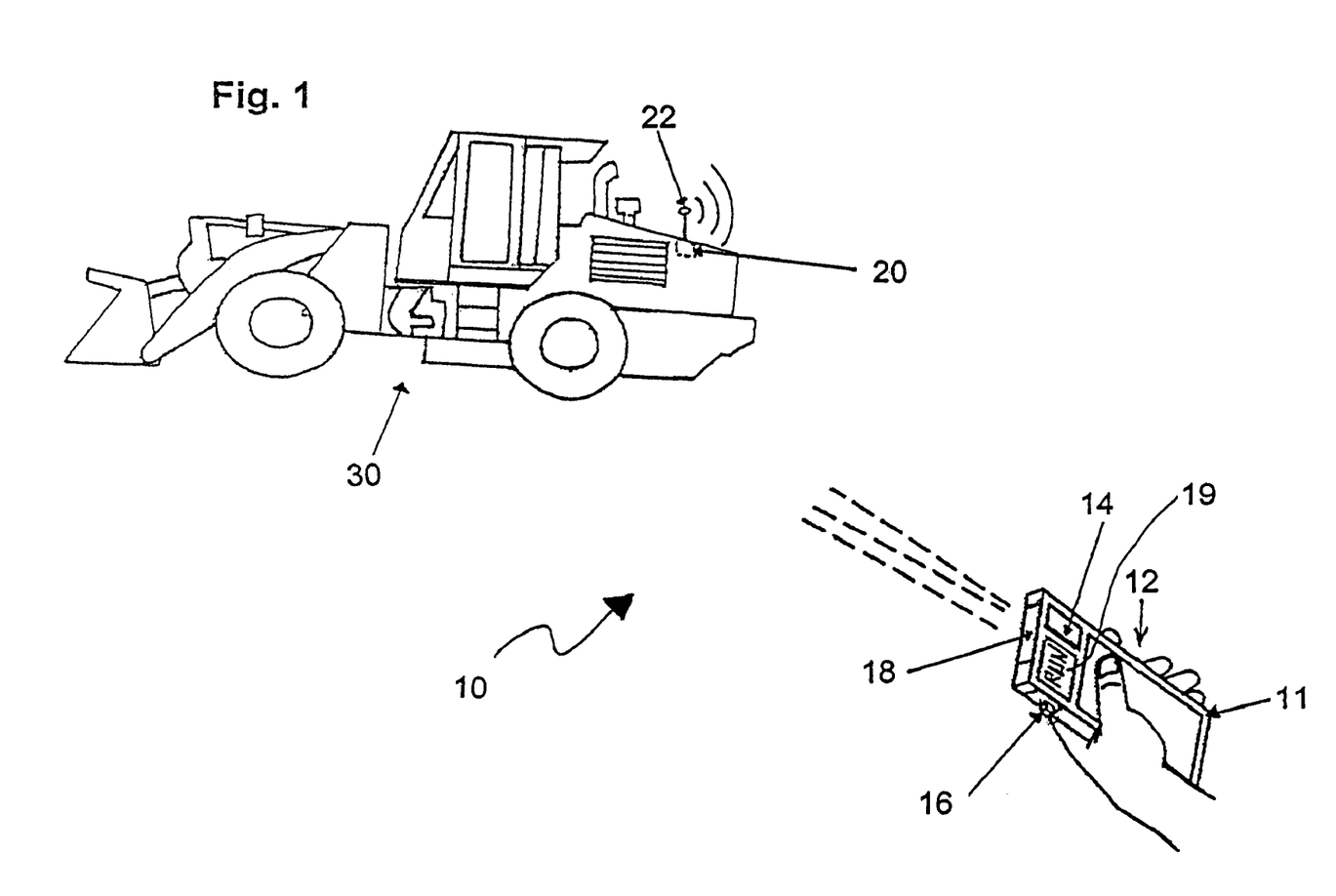
FIG. 1 is a diagrammatic overview of a remotely controllable shutoff system according to a first illustrative embodiment of the invention.
Figure 2A:
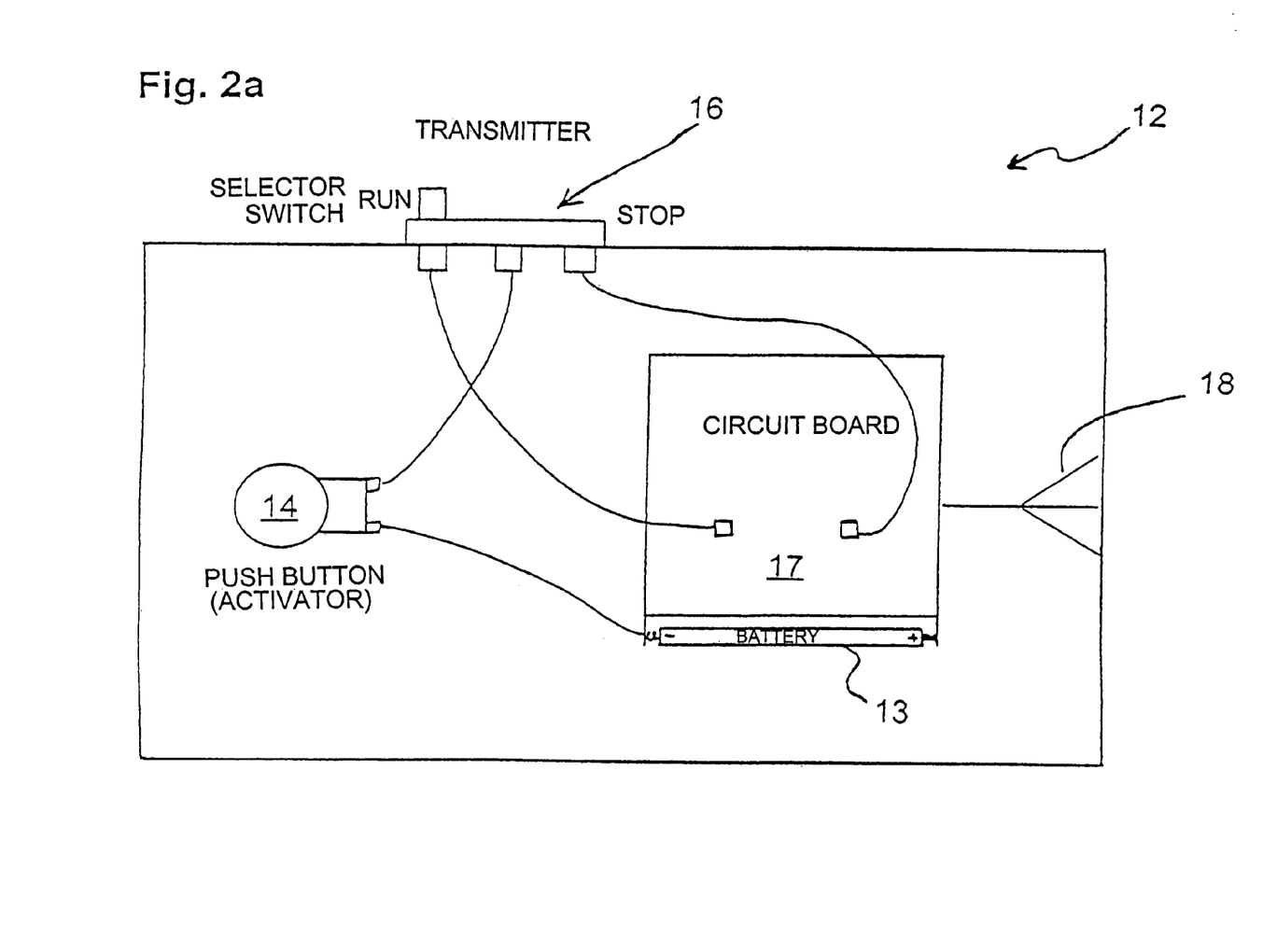
FIG. 2a is a diagram of a remote transmitter unit according to an illustrative embodiment of the invention.
Figure 2B:
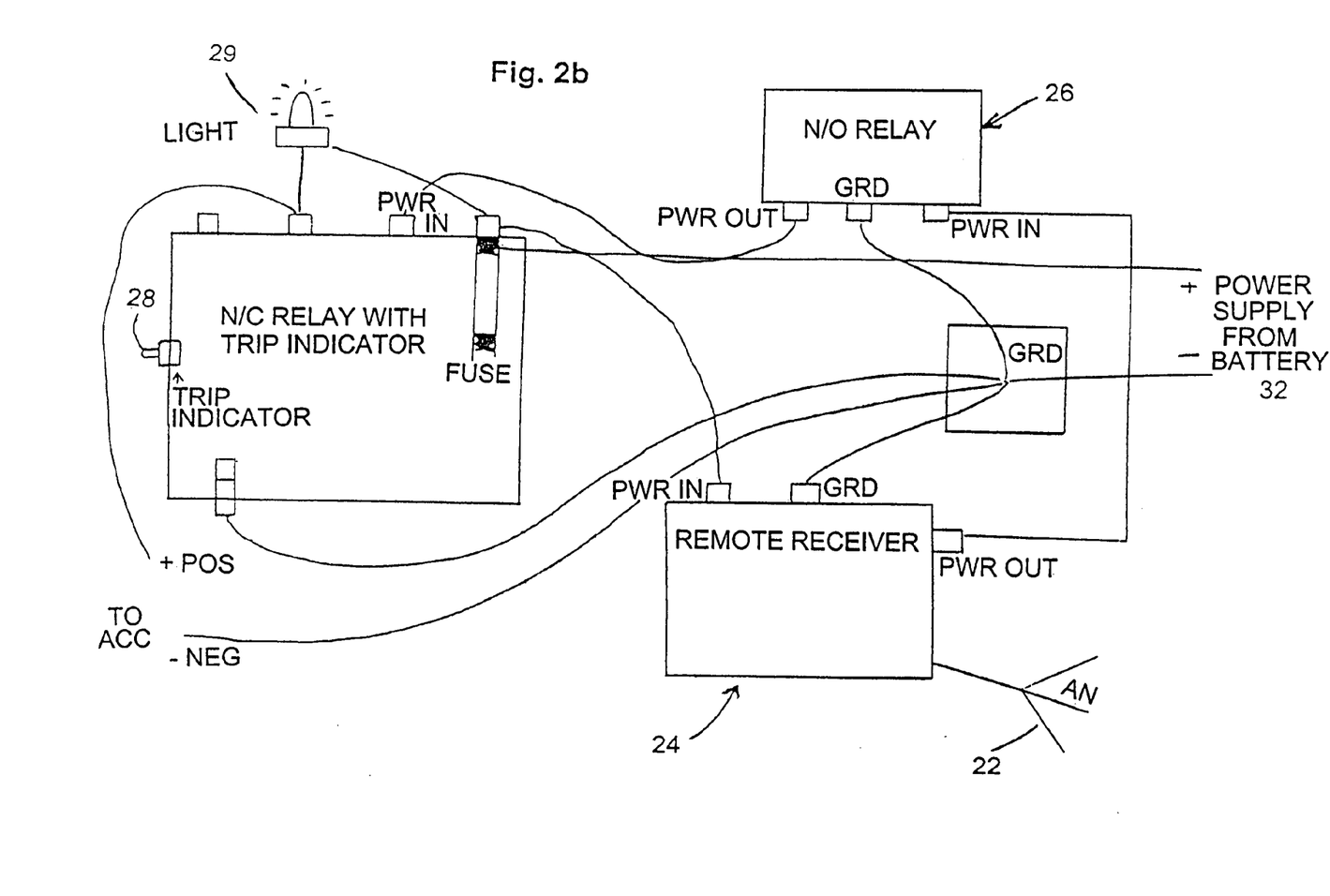
FIG. 2b is a diagram of a receiver unit according to an illustrative embodiment of the invention.

Referring to FIGS. 1, 2a and 2b, a remotely controllable shutoff system, according to a first embodiment of the invention, is shown generally at 10. The system 10 generally includes a remote transmitter assembly 12 and a receiver unit 20. In FIG. 1, the receiver unit 20 is shown installed in a movable machine 30. An earth mover is used as an example of a movable machine 30, but it will be understood that the system 10 hereof may be used with many different kinds of stationary or movable machines. The system 10 is operable to generate an alarm and/or to quickly interrupt operation of, and to temporarily disable machinery 30, when installed thereon and when activated by a user.

The Transmitter

Specifically referring to FIGS. 1 and 2a, the remote transmitter assembly 12, in the first depicted embodiment, is a hand-held unit including a protective outer shell 11, a shutoff-initiating push button 14, manual reset switch 16, a radio frequency (RF) signal generator 17, and an RF antenna 18. The transmitter assembly 12 may be powered by a battery 13 and may, optionally, include a visual display 19 for displaying system status (run or stop).

The protective outer shell 11 is constructed of a strong, lightweight material such as plastic, metal or the like. The outer shell 11 is weather resistant, and is ergonomically shaped to enable a user to actuate either mechanism 14 or 16 with one hand. The machine shutoff push button 14 allows a spotter, observer or other user to initiate signal transmission to activate the shutoff system 10, to interrupt operation of the machine 30.

The machine 30 may be interrupted by, for example, interrupting the flow of electrical power thereto, cutting power to a selected portion thereof, temporarily disabling a hydraulically actuated subsystem thereof, or by cutting off fuel flow to the machine's engine. Other means of disabling the machine 30 will occur to those in the art.

In the first depicted embodiment, the shutoff mechanism 14 includes a push button; alternatively, a toggle switch, slide switch, voice activated switch or other known switch may be used.

In the system 10 depicted in FIG. 1, the manual reset switch 16 operates to terminate the shutdown signal from the remote transmitter 12, thereby enabling the machine 30 to resume operation. The manual reset switch 16 further serves as an additional safety mechanism, since the movable machine 30 may not resume operation until the manual reset switch 16 is reset.

The RF signal generator 17 is operable to generate a shutoff signal when activated. As depicted in the illustrative embodiment of FIG. 1, the RF antenna 18, which sends the shutoff signal to the receiver unit 20, is located internally within the remote transmitter assembly 12. Alternatively, the RF antenna 18 may be positioned externally on the transmitter assembly 12.

Additional embodiments of the remote transmitter assembly 12 may include a visual display 19 for indicating status of the system (e.g. RUN or STOP). Where used, the visual display 19 may include one or more static or flashing lights, LEDs, a liquid crystal display screen, or other known visual display. In addition, the transmitter assembly may include a sound generator, such as a buzzer or beeper to alert appropriate personnel that the system has been deployed.

In yet another embodiment thereof, the transmitter 12 may be incorporated within a two-way radio unit, for convenient handling by the spotter.

Modifications of the system 10 may include a programmable/re-programmable microprocessor within the transmitter assembly 12, which may work in conjunction with a frequency selector. The use of such a programmable microprocessor and frequency selector enables one or more multiple remote transmitter assemblies 12 to be used simultaneously with a single receiver unit 20, and similarly allows for the use of any one of a plurality of remote transmitter assemblies 12 with any one of a plurality of receiver units 20. Up to sixteen remote transmitters may be used, as appropriate for a particular application.

The Receiver

Referring to FIGS. 1 and 2b, the receiver unit 20 portion of the system 10 is provided for installation within a stationary or movable machine, such as that shown at 30. The receiver unit 20 is installed at an intermediate location to set an audible and/or visual alarm when activated, and may be operable to effectively interrupt the power of the machine 30 or section thereof (e.g. hydraulic pump, drivetrain, fuel system, etc.) upon receipt of a signal by the receiver 20 from the remote transmitter 12, when the shutoff button is pressed. Selected wireless radio receivers are commercially available from Inovonics Wireless Corp. of Louisville, Colo.

Optionally, the receiver 20 may also include a two-way radio for voice communications.

Further referring to FIGS. 1 and 2b, the receiver unit 20 includes an RF antenna 22, RF receiver 24, relay 26, and manual reset switch 28. The RF antenna 22 and the reset switch 28 may be fixed externally on the body of the machine 30, or may be positioned internally within the machine. Regardless of its position, the RF antenna 22 provides reception of an activated signal for the receiving unit 20.

As depicted in the illustrative embodiment of FIG. 2b, upon receiving a shutoff signal from the remote transmitter 12, the RF receiver 24 delivers a prompt to the relay 26. In turn, the relay opens a circuit in the manual reset switch 28, which interrupts a selected function or system of the machine 30. The machine may be interrupted by disabling a fuel solenoid from the ignition, thereby immobilizing operation of the entire vehicle. Alternatively, the switch 28 could operate to shut off ignition power to an internal combustion engine, temporarily interrupting operation thereof.

If the ability to disable the machine is not immediately necessary, the relay 26 may simply activate an audible and/or a visual alarm.

As illustrated in FIGS. 1, 2a and 2b, in the first embodiment of the invention, each of the transmitter 12 and the receiver unit 20 includes a manual reset 16 and 28, respectively. Once the system 10 has been activated, the machine 30 is temporarily disabled, and operation of the machine 30 cannot resume unless and until both manual reset switches 16 and 28, respectively, are manually returned to the operational position.

Second Embodiment

Figure 3:
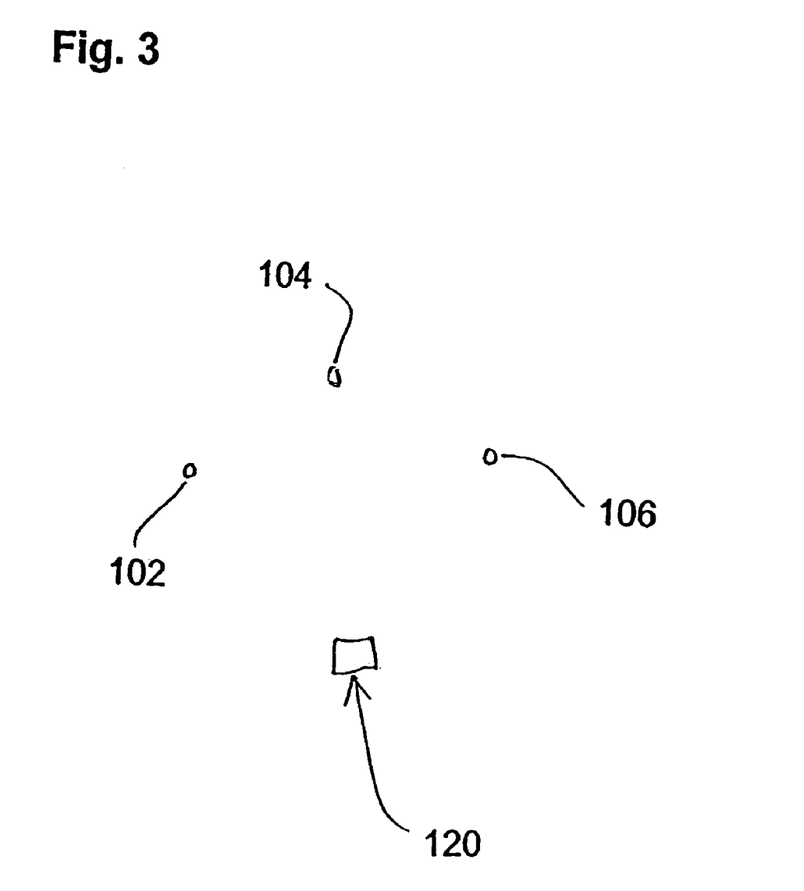
FIG. 3 is a diagram of a system according to another embodiment of the invention.

FIG. 3 shows a second embodiment of a system 110 according to the present invention. In the embodiment of FIG. 3, a single receiver 120 may be activated by any one of a plurality of transmitters 102, 104, 106, provided for a situation where multiple observers, operators or spotters are required to work around one or more closely spaced machine(s). Any one of the transmitters 102, 104, 106 may independently be used to set an alarm and/or to disable the machine 30, as needed. Once disabled, the machine 30 cannot be restarted until at least one manual reset switch on deactivating transmitter and/or on the receiver is/are manually reset. Each of the transmitters 102, 104, 106, in the embodiment of FIG. 3, is substantially similar or identical to the transmitter 12 as described in connection with the first embodiment, and may, optionally, include a two-way radio for voice communications.

Another alternative installation of the receiver unit 20, i.e. where the system 10 interrupts a power supply, may be implemented to temporarily disable only a section of the vehicle. By way of example, front-end loaders are widely used in the construction industry. A front-end loader may have the system 10 installed in a manner so as to temporarily disable the only the hydraulic action of the vehicle.

Other, optional modifications of the receiver unit 20 of the system 10 may include display lights, such as that shown at 29, for placement within the cab of the vehicle or mounted externally on a machine, to visually display the status of the system 10 (e.g. RUN or STOP).

Further, the manual reset switch 28 may alternatively be a push/pull switch located within the cab of the vehicle, or on a machine, within reach of the operator or, as previously stated with respect to the remote transmitter assembly 12, used cooperatively with a two-way radio system.

Third Embodiment

Referring now to FIGS. 4A–4C and 5, a system 210 according to a third embodiment of the invention is shown, including at least one transmitter 212 and at least one receiver 220.

Figure 4A:
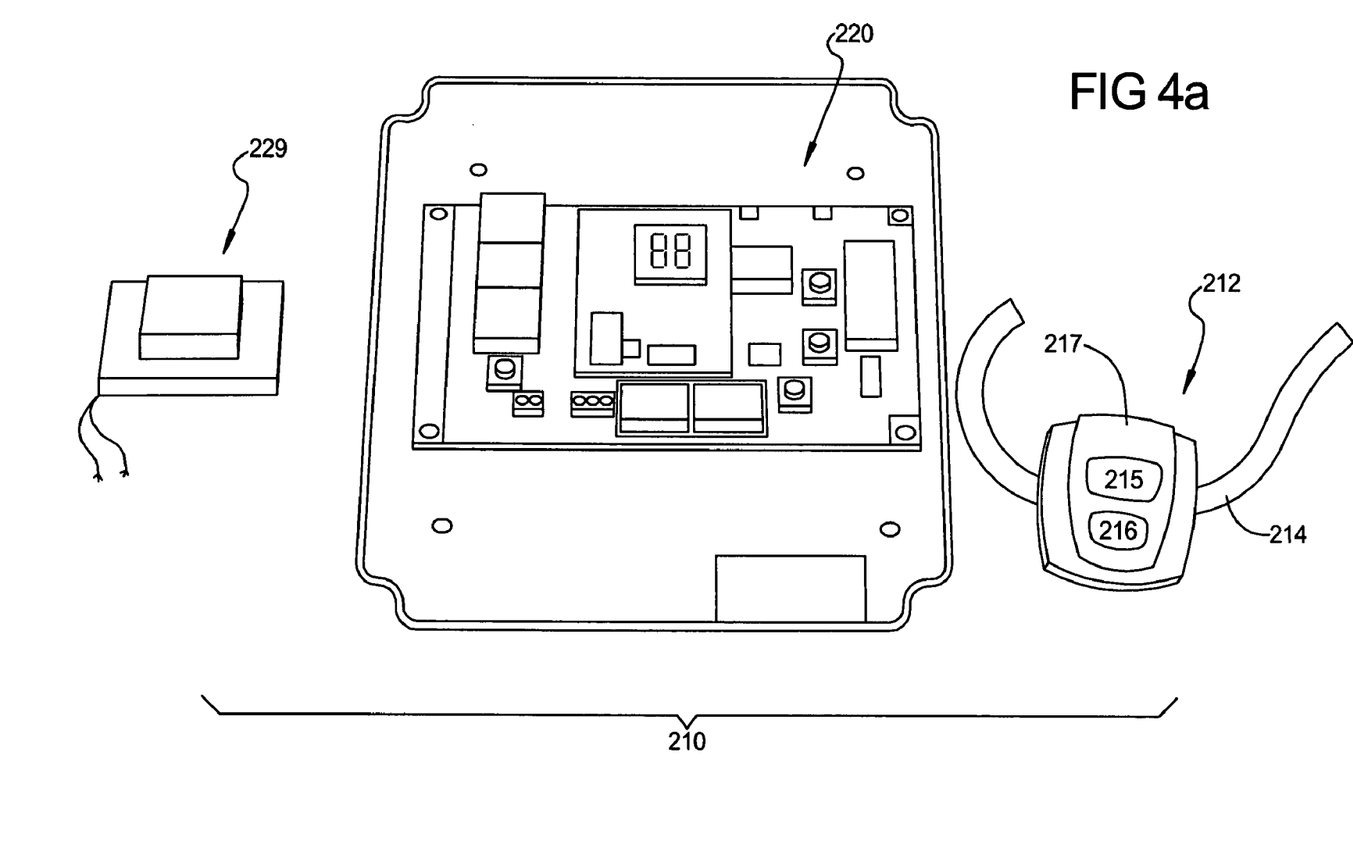
FIG. 4A is a perspective view of a remotely activatable shutoff/alarm system according to another embodiment of the invention, with a cover removed from the receiver for illustrative purposes.
Figure 4B:
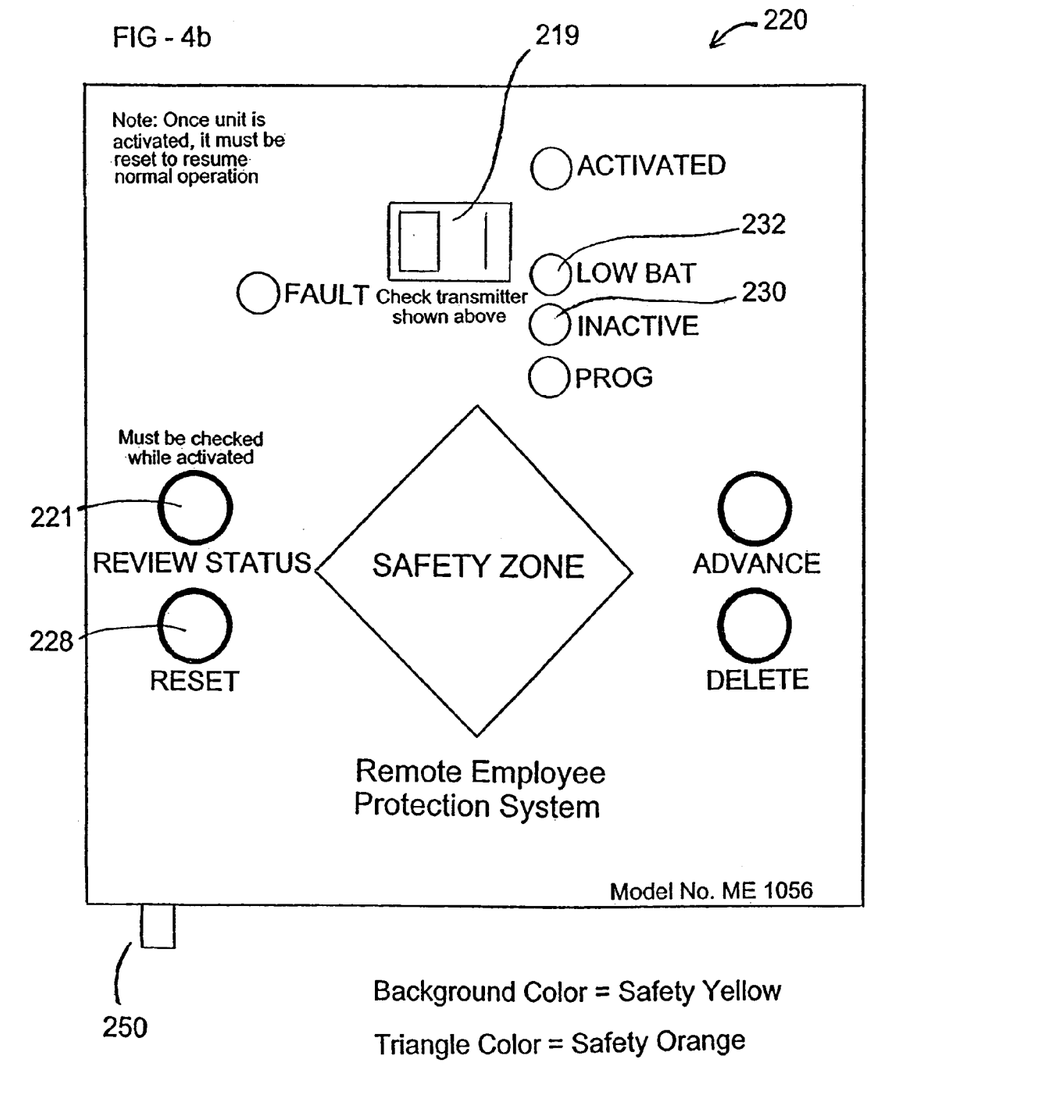
FIG. 4B is a diagram of a receiver control panel according to the embodiment of FIG. 4A.
Figure 4C:
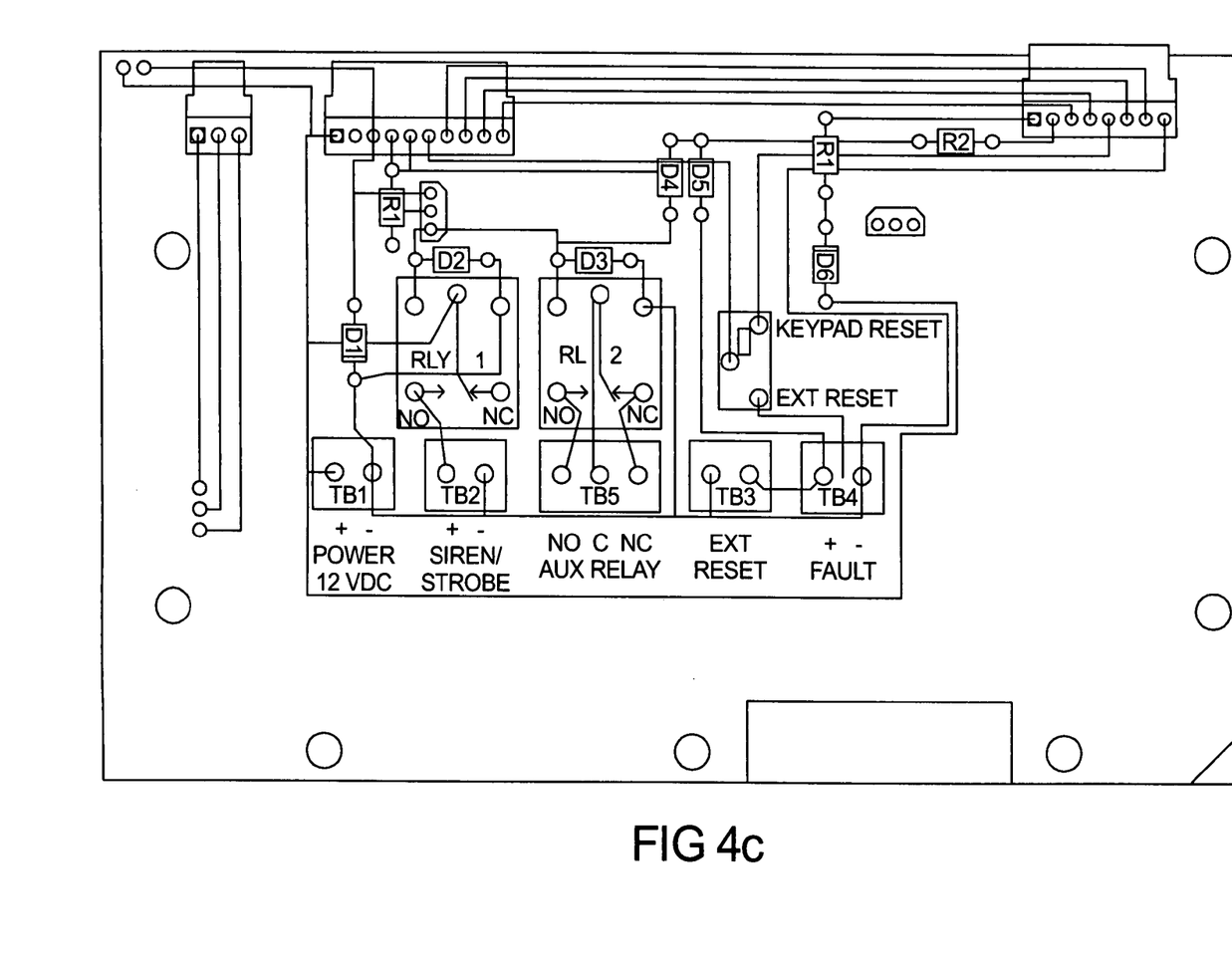
FIG. 4C is a schematic diagram of one possible circuit design for the receiver of FIG. 4A.
Figure 5:
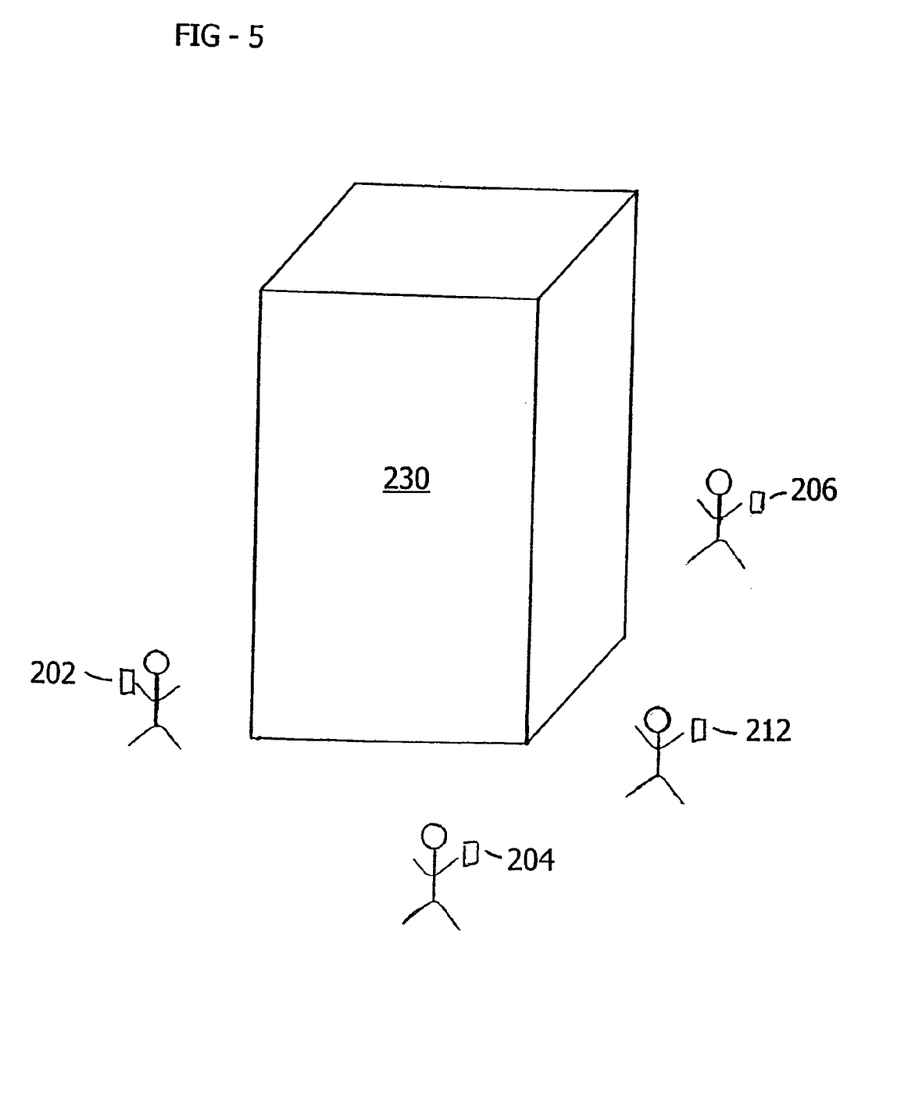
FIG. 5 is an illustration of a large stationary machine incorporating the system of FIG. 4A and shown with several workers in the vicinity thereof, each of the workers carrying a transmitter.

In this third embodiment, the system 210 includes only a single manual reset switch 228 located on the receiver 220. The receiver 220 is designed to be used with up to 16 transmitters simultaneously, as needed. The receiver 220 includes a visual display unit 219 and, if a shutoff signal is received from a transmitter and the review status button 221 is pressed, the visual display unit will show the number of the triggering transmitter. The receiver includes a Power-on indicator 250, which may include a bulb or LED. The system 210 also includes a visual and audio alarm unit 229 for placement in, on or around a machine 230 (FIG. 5). Four transmitters 202, 204, 206 and 212 are shown in FIG. 5, although up to 16 transmitters may be used, as needed.

In this third embodiment, the transmitter may include a wrist strap 214 and/or a clip on the back thereof, to allow it to be worn on a belt or pocket. The transmitter 212 does not include a separate manual reset switch in the third embodiment of the invention, but does include dual activation buttons 215, 216 thereon, as shown. The buttons 215, 216 are wired in series so that both buttons must be pressed simultaneously in order to interrupt operation of the machine 230.

The transmitter 212 shown in FIG. 4a is commercially available, and may be purchased from Inovonics Wireless Corp. of Louisville, Colo.

Where multiple transmitters are used, each transmitter is assigned a unique number and a separate radio frequency. The transmitter 212 and receiver 220 are communicating with one another at regular preset intervals, which may be in a range between 20 seconds and 2 minutes. This regular electronic communication assures good signal reception. If a signal is sent from the receiver 220 to the transmitter 212, and the same signal is not transmitted back to the receiver, a secondary audible and/or visual alarm on the receiver will be activated. A secondary alarm is shown at 230 in FIG. 4b. Also while the above signal is sent, the receiver 220 is checking for battery strength in the transmitter battery. If the transmitter's battery level is low, a third audible and/or visual alarm on the receiver will be activated. A third alarm is shown at 232 in FIG. 4b. Both of the above-mentioned alarms will be identified by an LED number on the face of the receiver, and may be reviewed using a review status button.

If a transmitter becomes lost or broken, instead of disabling the entire system 210, a function can be performed selecting the lost or broken transmitter number and temporarily removing that number from the system, so that the receiver 220 is no longer searching for that transmitter's signal. Once the lost or broken transmitter is repaired or replaced, a function is performed to reprogram the transmitter's number back into the system.

The siren/strobe relay provides a 12 volt DC output that may be used to drive the alarm unit 229, to alert the operator that a transmitter has been activated. Pressing the Review/status button on the receiver 220 will give a momentary visual indication of the transmitter number that has been activated. After investigating the reason for the activation, the operator may press the reset button and resume normal operation. An external reset switch may also be added to the system. A simple normally open switch can be wired to the EXT RESET terminal block. A switch on the receiver board located above the EXT RESET terminal block must be moved to the EXT RESET position, if an external reset switch is used.

An auxiliary 10 amp relay may be provided for the end user to customize the output of the receiver to meet his or her individual requirements. This relay will latch when a transmitter has activated the receiver, and will unlatch when the RESET button is pressed.

Although the present invention has been described herein with respect to a number of presently contemplated embodiments thereof, the foregoing description is intended to be illustrative, and not restrictive. Those skilled in the art will realize that many modifications of the preferred embodiment could be made which would be operable. All such modifications which are within the scope of the following claims, or foreseeable modifications thereof, are intended to be within the scope and spirit of the present invention.

What is claimed is:

1. A remotely controllable shutoff and alarm system for use in connection with a machine, said shutoff and alarm system comprising:
   at least one portable transmitter comprising a signal generator and a manual reset switch, said signal generator capable of generating and transmitting a shutoff signal when activated by a user;
   a receiver unit comprising a signal receiver and a manual reset switch, said receiver unit capable of receiving the shutoff signal from the transmitter, and being operable, when connected to said machine, to temporarily interrupt operation of at least a portion thereof; and an alarm generator for generating an audible alarm in response to receipt of a shutoff signal by the receiver unit;

wherein the system will not allow normal operation of the machine to resume, after the shutoff signal has been sent by the transmitter, until both the manual reset switches of the transmitter and the receiver unit have been switched to a run position;

wherein the system is adapted for use with a movable machine having wheels and an engine.

2. The shutoff and alarm system of claim 1, wherein the manual reset switch comprises a relay.

3. A movable machine having the receiver of claim 1 installed thereon, and the transmitter of claim 1 operatively associated therewith, wherein said movable machine is a large vehicle having wheels and an engine.

4. The shutoff and alarm system of claim 1, comprising a plurality of transmitters, each of the transmitters capable of independently transmitting a shutoff signal to said receiver.

5. The shutoff and alarm system of claim 1, wherein at least one of the transmitter and the receiver unit comprises a system status indicator, comprising a visual display and an audio signal generator.

6. The shutoff and alarm system of claim 1, wherein said receiver unit comprises a flashing light, adapted to be mounted at an elevated position on the machine such that the flashing light is visible to people in the vicinity of the machine, for indicating when a shutoff signal has been received.

7. The shutoff and alarm system of claim 1, wherein the receiver unit comprises a normally closed relay and a normally open relay.

8. The shutoff and alarm system of claim 1, wherein the system comprises a plurality of transmitters, wherein the receiver is in regular communication with each transmitter in a designated group, and wherein the receiver is programmable such that if a transmitter is temporarily removed from the vicinity of the receiver or brought back in or is rendered inoperative, the absent or inoperative transmitter can be removed from the group checked by the receiver.

9. The shutoff and alarm system of claim 1, wherein the at least one portable transmitter is operatively associated with a two-way radio for transmitting and receiving voice messages.

10. A remotely controllable shutoff system for use in connection with a machine, said shutoff system comprising:

at least two portable transmitters, each of said transmitters comprising a signal generator for generating and transmitting a shutoff signal when activated by a user; wherein said signal generator comprises a pair of activation buttons connected in series so that both buttons must be activated simultaneously to generate said shutoff signal, and each of said transmitters further comprising a first reset switch; and a receiver unit, comprising a signal receiver and a second reset switch, said receiver unit capable of receiving the shutoff signal from each of the transmitters, and being operable, when connected to a machine, to interrupt operation of at least a portion thereof;

wherein the system will not allow normal operation of the machine to resume, after the shutoff signal has been sent by any one of the transmitters, until the both the first and second reset switches have been switched to respective run positions;

wherein the system is adapted for use with a movable machine having wheels and an engine.

11. A movable machine having the receiver of claim 10 installed thereon, and the transmitters of claim 10 operatively associated therewith, wherein said movable machine is a large vehicle having wheels and an engine.

12. The shutoff system of claim 10, wherein each of the transmitters is operatively associated with a two-way radio for transmitting and receiving voice messages.

13. The shutoff system of claim 10, wherein at least one of the transmitter and the receiver unit comprises a system status indicator comprising a visual display and an audio signal generator.

14. The shutoff system of claim 10, wherein said receiver unit comprises a light, adapted to be mounted at an elevated position on said machine such that the flashing light is visible to people in the vicinity of the machine for indicating when a shutoff signal has been received.

15. The shutoff system of claim 10, wherein the receiver unit comprises a normally closed relay and a normally open relay.

16. The shutoff system of claim 10, wherein the receiver is in regular communication with each transmitter in a designated group, and wherein the receiver is programmable such that if a transmitter is temporarily removed from the vicinity of the receiver or is rendered inoperative, the absent or inoperative transmitter can be removed from the group checked by the receiver.

* * * * *